(12) United States Patent
Sickler

(10) Patent No.: US 6,466,829 B1
(45) Date of Patent: Oct. 15, 2002

(54) TABLE LOOK-UP METHOD FOR DYNAMIC CONTROL

(75) Inventor: John R. Sickler, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/553,251

(22) Filed: Apr. 20, 2000

(51) Int. Cl.[7] ............................................... G05B 11/01
(52) U.S. Cl. ........................... 700/25; 701/54; 701/103; 708/235
(58) Field of Search .............................. 700/25; 701/54, 701/103–104; 708/235, 290

(56) References Cited

U.S. PATENT DOCUMENTS 4,619,234 A * 10/1986 Okamoto .................... 123/357
6,272,424 B1 * 8/2001 Yoshida et al. ............. 701/103
6,338,018 B1 * 1/2002 Baker ......................... 701/104

* cited by examiner

Primary Examiner—Thomas Black
Assistant Examiner—Ronald D Hartman, Jr.
(74) Attorney, Agent, or Firm—Jimmy L. Funke

(57) ABSTRACT

An improved table look-up method for dynamic control applications, wherein a previous index value is used as a starting point for quickly and efficiently identifying the independent variable values that bracket the input value. At each table look-up request, the input is compared to the independent variable value associated with the last index value from the previous look-up request, and the index is then incremented or decremented from that point to identify the pair of independent variable data points that bracket the input value. In most dynamic control applications, the table is used to update the dependent variable at a fast rate relative to the rate of change of the input value, and the subject look-up method provides a significant speed improvement.

3 Claims, 2 Drawing Sheets

| INDEX | X | Y |
|---|---|---|
| 0 | 0 | -5000 |
| 1 | 400 | -4500 |
| 2 | 500 | -3400 |
| 3 | 600 | -3300 |
| 4 | 700 | -2500 |
| 5 | 800 | -1900 |
| 6 | 850 | -1300 |
| 7 | 900 | -900 |
| 8 | 950 | -500 |
| 9 | 1000 | -300 |
| 10 | 1050 | -100 |
| 11 | 1075 | 0 |
| 12 | 2000 | 25 |
| 13 | 2075 | 375 |
| 14 | 3000 | 459 |
| 15 | 3025 | 899 |
| 16 | 3200 | 1222 |
| 17 | 3400 | 1899 |
| 18 | 3600 | 2300 |
| 19 | 3800 | 4900 |
| 20 | 4000 | 7777 |
| 21 | 4200 | 899 |
| 22 | 4400 | 45 |
| 23 | 4600 | 567 |
| 24 | 4800 | 890 |
| 25 | 5000 | 56 |

| INDEX | X | Y |
|---|---|---|
| 0 | 0 | -5000 |
| 1 | 400 | -4500 |
| 2 | 500 | -3400 |
| 3 | 600 | -3300 |
| 4 | 700 | -2500 |
| 5 | 800 | -1900 |
| 6 | 850 | -1300 |
| 7 | 900 | -900 |
| 8 | 950 | -500 |
| 9 | 1000 | -300 |
| 10 | 1050 | -100 |
| 11 | 1075 | 0 |
| 12 | 2000 | 25 |
| 13 | 2075 | 375 |
| 14 | 3000 | 459 |
| 15 | 3025 | 899 |
| 16 | 3200 | 1222 |
| 17 | 3400 | 1899 |
| 18 | 3600 | 2300 |
| 19 | 3800 | 4900 |
| 20 | 4000 | 7777 |
| 21 | 4200 | 899 |
| 22 | 4400 | 45 |
| 23 | 4600 | 567 |
| 24 | 4800 | 890 |
| 25 | 5000 | 56 |

TABLE LOOK-UP METHOD FOR DYNAMIC CONTROL

TECHNICAL FIELD

This invention relates to dynamic control by table look-up, and more particularly to an efficient table look-up method.

BACKGROUND OF THE INVENTION

In dynamic control applications, look-up tables are commonly utilized to relate one or more measured independent variables to a dependent variable. In vehicle engine controls, for example, a look-up table is customarily used to store fuel injection pulse width as a function of measured engine speed and measured engine load. On a simpler level, look-up tables may be used to convert a sensor measurement to an output in standard units. In any event, dynamic control applications typically require frequent updating of the retrieved information so that the dependent output variable continuously reflects the current value of the independent input variable.

In general, and using a two-dimensional example, a look-up table may be represented by the table of FIG. 2, which stores a number of X,Y data pairs, where X is the independent variable and Y is the dependent variable. The data points are stored in ascending (or descending) order of the independent variable, and the term "index" is used to identify a pair of data points that bracket a measured value (input) of the independent variable (X). For example, an index having a value of 12 is used to bracket an input value that is at least 2000 but less than 2075. The output (Y) value corresponding to the input value is then determined by interpolation.

In conventional practice, a table look-up is carried out by resetting the index to the top (or bottom) of the table (for example, index=0, or index=25), and then successively incrementing (or decrementing) the index until the input value is bracketed by the associated independent variable values. This procedure tends to be overly time consuming, particularly in demanding applications involving many look-up tables and requiring a high throughput. Accordingly, what is needed is a more efficient and faster table look-up method.

SUMMARY OF THE INVENTION

The present invention is directed to an improved table look-up method for dynamic control applications, wherein a previous index value is used as a starting point for quickly and efficiently identifying the independent variable values that bracket the input value. At each table look-up request, the input is compared to the independent variable value associated with the last index value from the previous look-up request, and the index is then incremented or decremented from that point to identify the pair of independent variable data points that bracket the input value. In most dynamic control applications, the table is used to update the dependent variable at a fast rate relative to the rate of change of the input value, and the lookup method of this invention provides a significant speed improvement.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figures 1, 2:
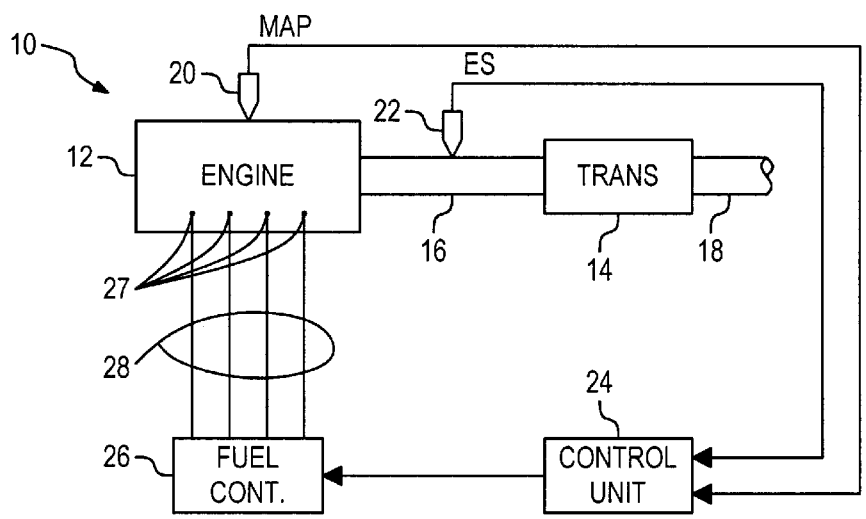
FIG. 1 is a block diagram of a motor vehicle fuel control system, including a microprocessor based control unit.
FIG. 2 is a representation of a look-up table stored in the microprocessor based control unit of FIG. 1.

Referring to FIG. 1, the look-up method of this invention is described in the context of a motor vehicle fuel control application. The reference numeral 10 generally designates a typical motor vehicle powertrain including an internal combustion engine 12 and a transmission 14, with the engine output shaft 16 being coupled to an input of transmission 14, and the transmission output shaft 18 being coupled to drive the vehicle. A number of engine parameters relevant to fuel control, including manifold absolute pressure and engine speed, are measured with corresponding sensors 20, 22, and the produced signals (MAP, ES) are provided as inputs to microprocessor based control unit 24. The control unit 24, in turn, receives the input signals and executes a series of program instructions comprising a fuel control algorithm. The algorithm is carried out with empirically determined or calibrated data stored in control unit 24 in the form of look-up tables such as the table of FIG. 2, described above. For example, a two-dimensional look-up table may be used to convert the MAP signal to a pressure signal in standard units, thereby compensating for non-linear sensor transfer function characteristics, and a three-dimensional look-up table may be used to retrieve a calibrated fuel pulse value as a function of MAP and ES. In any event, the fuel control algorithm culminates in the formation of a fuel pulse width signal that is provided as an input to fuel controller 26, which in turn provides individual injector control signals to engine fuel injectors 27 via lines 28.

Figure 3:
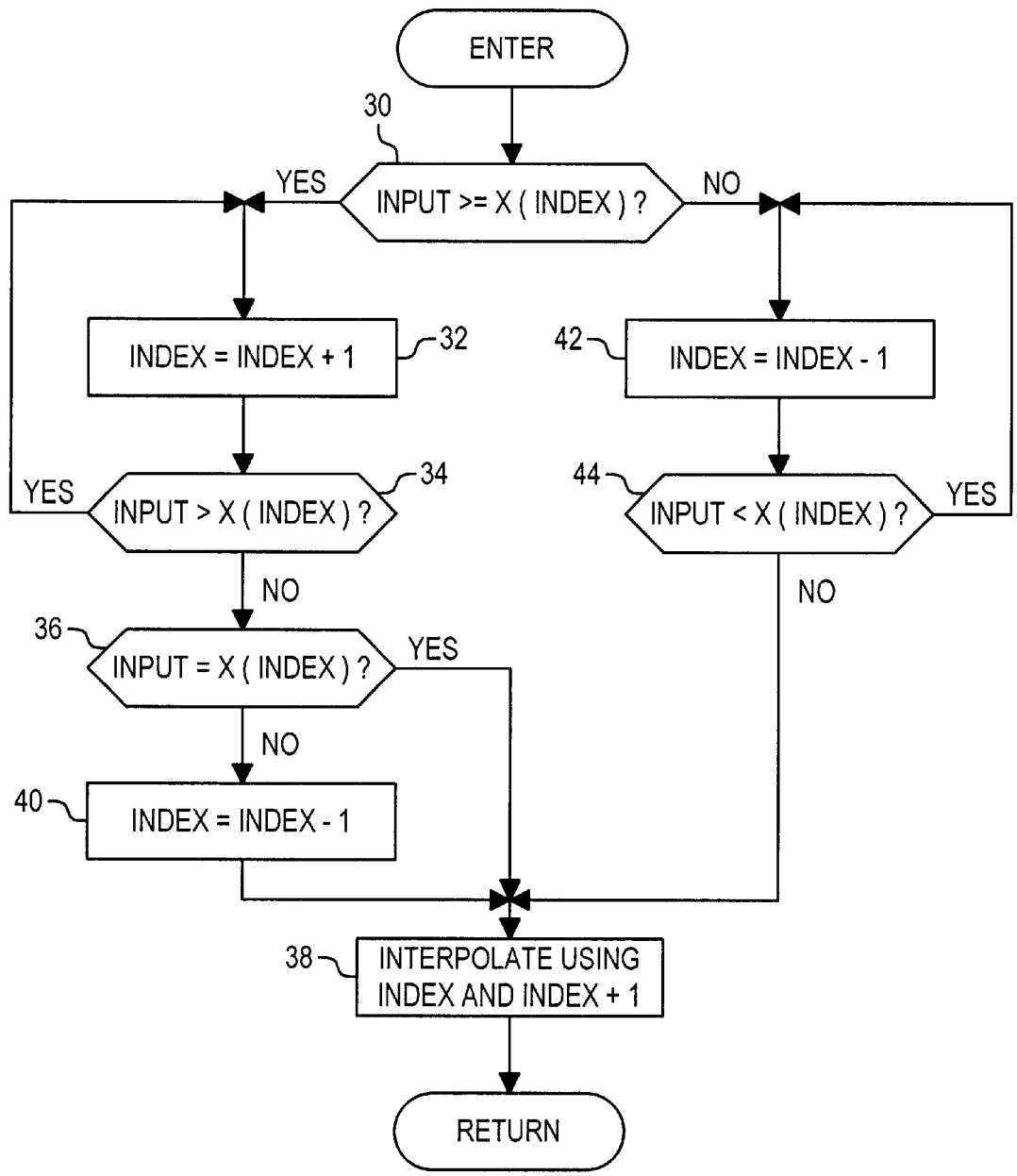
FIG. 3 is a flow diagram representative of computer program instructions executed by the microprocessor based control unit of FIG. 1 in carrying out the method of this invention.

The look-up method of this invention is described by the flow diagram of FIG. 3, which represents computer program instructions executed by the control unit 24. The flow diagram essentially represents a routine executed each time a table look-up operation is requested. Initially, the index value for each table is initialized, preferably to a value approximating an expected input condition.

When the look-up routine is executed, the block 30 first determines if the INPUT (which may be engine speed ES, for example) is greater than or equal to X(INDEX), the table value of the independent variable associated with the starting value of INDEX. For example, referring to FIG. 2, it will be assumed that INDEX initially has a value of 12, which corresponds to the X,Y data pair of (2000, 25). If INPUT is greater than or equal to 2000, block 30 is answered in the affirmative, and the blocks 32–40 are executed to increment INDEX until the independent variable table entries associated with INDEX bracket INPUT. Conversely, if INPUT is less than 2000, block 30 is answered in the negative, and the blocks 42–44 are executed to decrement INDEX until the associated independent variable table entries bracket INPUT.

If block 30 is answered in the affirmative, the blocks 32–34 increment INDEX, and then determine if INPUT is still greater than X(INDEX). If so, the blocks 32–34 are re-executed until block 34 is answered in the negative. For example, if INPUT has a value of 3100, INDEX must be incremented four times before block 34 is answered in the negative. At such point, the block 36 determines if INPUT is equal to X(INDEX). If so (if INPUT has a value of 3200, for example), the value of INDEX is correct, and block 38 is executed to compute the interpolation equation based on table pointer values of INDEX and INDEX +1. Block 36 will be answered in the negative if INPUT is less than X(INDEX); in such case, block 40 decrements INDEX before block 38 is executed to interpolate the table values.

If block 30 is answered in the negative (INPUT <X(INDEX)), the blocks 42–44 decrement INDEX, and then determine if INPUT is still less than X(INDEX). If so, the blocks 42–44 are re-executed until block 44 is answered in the negative. For example, if INPUT has a value of 1025, INDEX must be decremented three times before block 34 is answered in the negative. At such point, the value of INDEX is correct, and block 38 is executed to compute the interpolation equation based on table pointer values of INDEX and INDEX +1, as described above.

In summary, the INDEX value is incremented or decremented from an initial value as required so that INPUT will be at least as great as the independent variable corresponding to INDEX, and less than the independent variable corresponding to INDEX+1. The interpolation equation represented by block 38 and referred to above is simply a conventional linear mathematical proportioning of the dependent variable values based on the value of INPUT relative to the two independent variable values that bracket INPUT.

Improved speed is achieved according to this method because the starting point of the variable INDEX is the INDEX value utilized in the previous look-up for the same table. For example, if INPUT has a value of 1025, resulting in an INDEX value of 9, the next table look-up request will enter the routine of FIG. 3 with an INDEX value of 9. In dynamic control applications, the required update rate of the dependent variable (Y) is at least as fast as the expected rate of change of INPUT, so that the INDEX starting point according to this method is much closer (on average) to its required value than in methods where INDEX is initialized to an arbitrary value at each table look-up request. The result, of course, is a significant speed improvement compared to previously known look-up methods.

While the method of this invention has been described in reference to the illustrated embodiment, it is expected that various modifications in addition to those mentioned above will occur to those skilled in the art. For example, the method is easily extended to tables having two or more independent variables. Accordingly, it will be understood that methods incorporating such modifications may fall within the scope of this invention, which is defined by the appended claims.

What is claimed is:

1. A method for obtaining a dependent variable output from a look-up table based on an input representing a current value of an independent variable, the table containing a series of data pairs of corresponding independent and dependent variable values ordered based on the independent variable value, and an index having a value associated with each of the data pairs, the method comprising the steps of:

identifying a starting point index value, and comparing the input to an independent variable value of a data pair associated with said starting point index value;

incrementally adjusting said starting point index value until the input is bracketed by stored independent variable values of first and second data pairs, one of which is associated with the adjusted index value;

determining said dependent variable output by interpolation based on the input and said first and second data pairs; and saving said adjusted index value as the starting point index value for a subsequent look up from said table.

2. The method of claim 1, wherein the data pairs are stored in ascending order of the independent variable value, and the step of incrementally adjusting said starting point index value includes the step of:

successively incrementing the starting point index value so long as the input is greater than an independent variable value of a data pair associated with the incremented index value.

3. The method of claim 1, wherein the data pairs are stored in ascending order of the independent variable value, and the step of incrementally adjusting said starting point index value includes the step of:

successively decrementing the starting point index value so long as the input is less than an independent variable value of a data pair associated with the decremented index value.

\* \* \* \* \*